Figure 1:
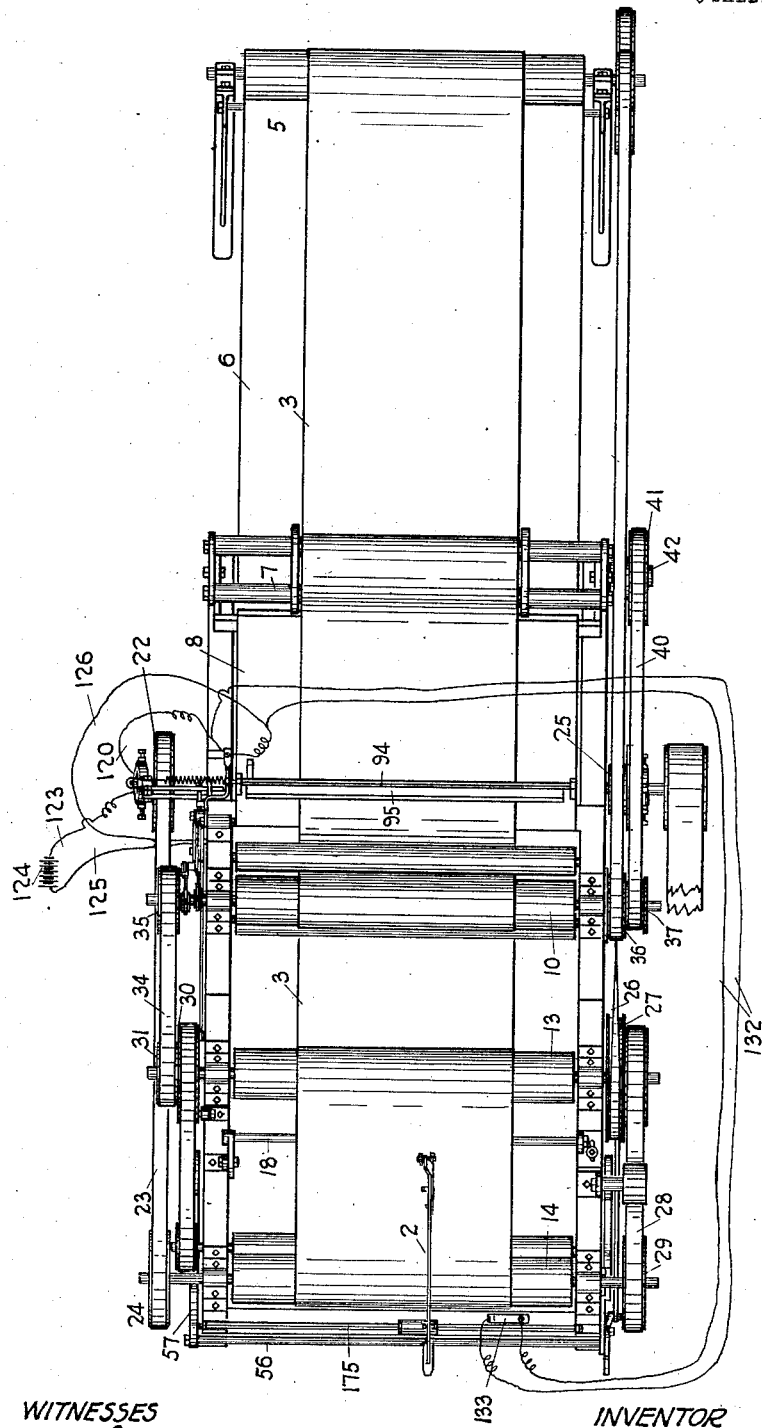
Figure 20:
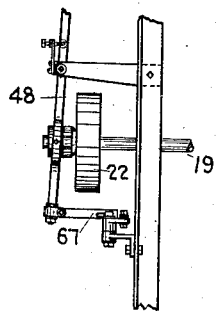
Figure 21:
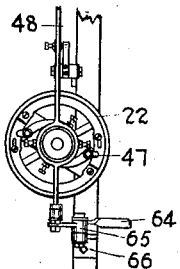
Figure 22:
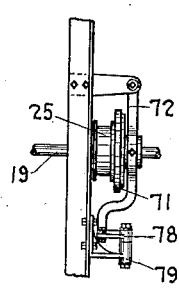
Figure 23:
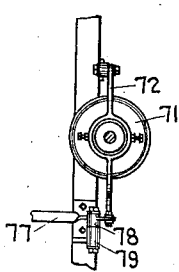
Figure 24:
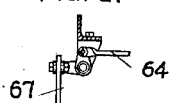
Figure 25:

A. MORTON.
PILE CUTTING MACHINE.
APPLICATION FILED APR. 15, 1907.

1,016,512.

Patented Feb. 6, 1912.
8 SHEETS—SHEET 1.

WITNESSES
James H. Thurston
Catherine G. Bradley

INVENTOR
Arthur Morton,
BY Wilmarth H. Thurston,
ATTORNEY

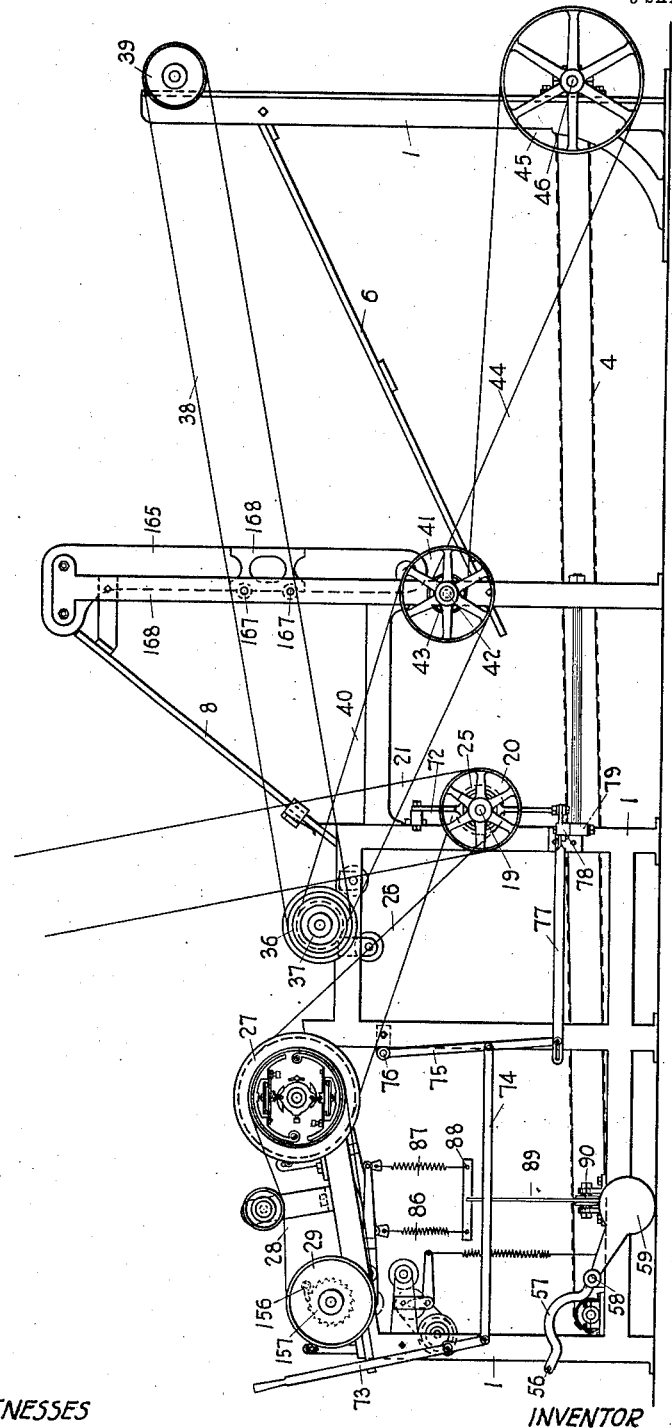

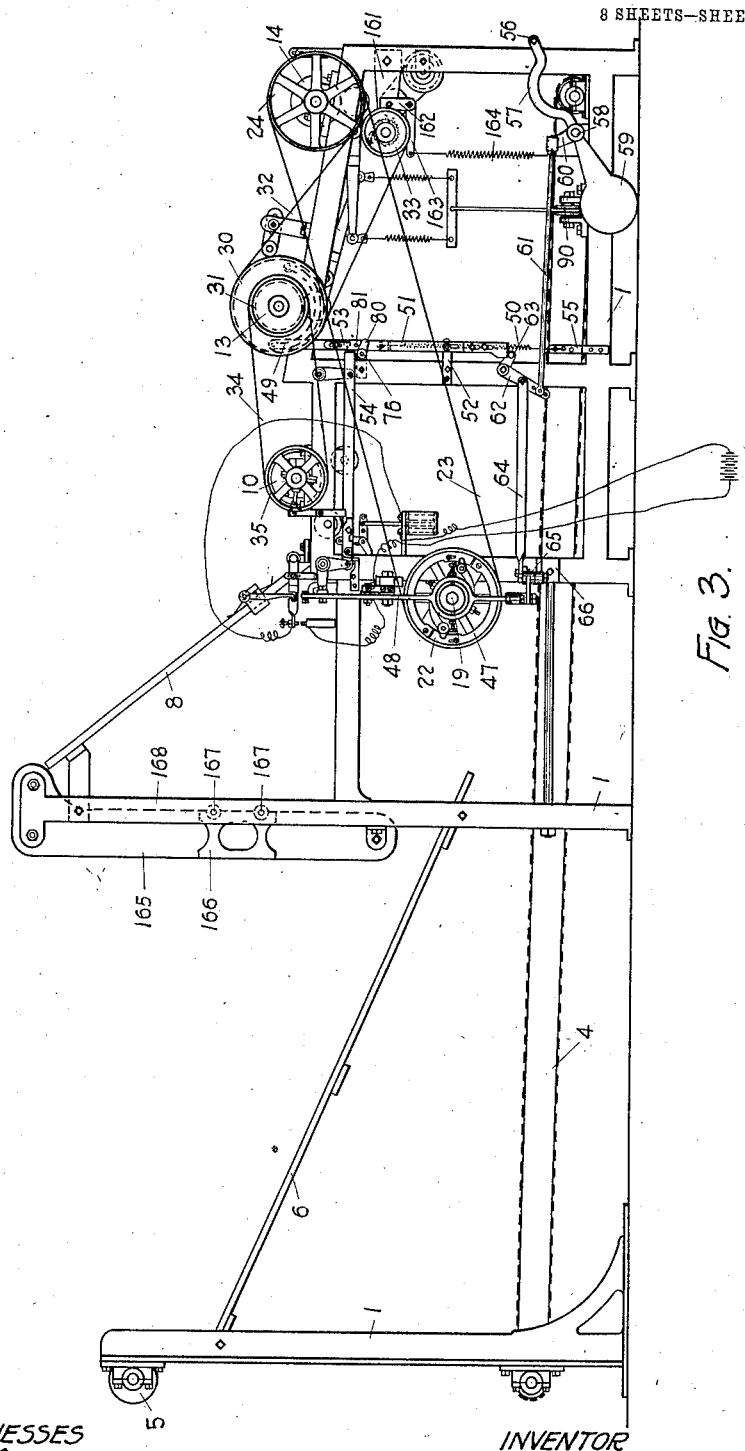

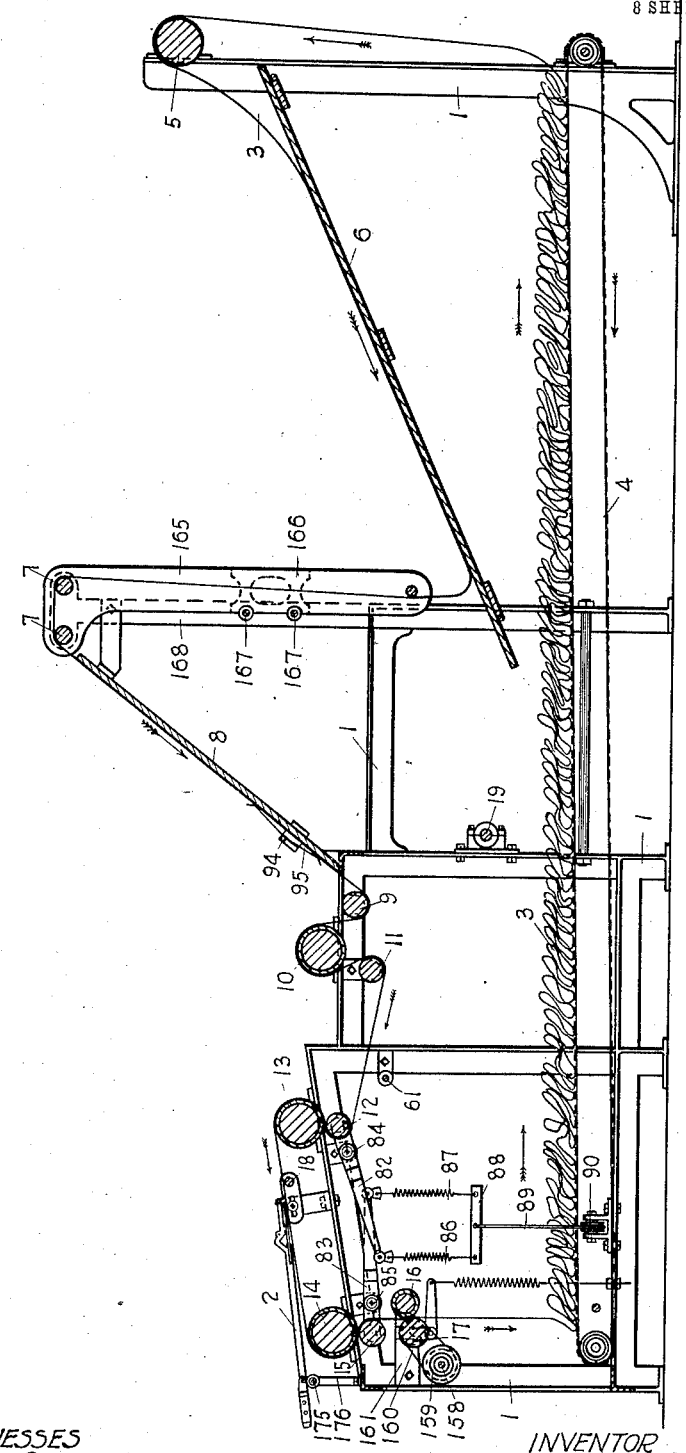

A. MORTON.
PILE CUTTING MACHINE.
APPLICATION FILED APR. 15, 1907.

1,016,512.

Patented Feb. 6, 1912.
8 SHEETS—SHEET 5.

WITNESSES
James H. Thurston
Katherine G. Bradley

INVENTOR
Arthur Morton,
BY Wilmarth H. Thurston,
ATTORNEY

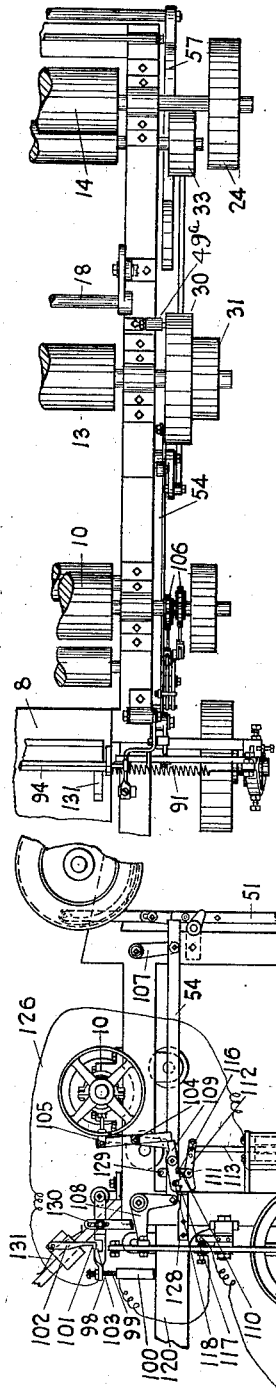

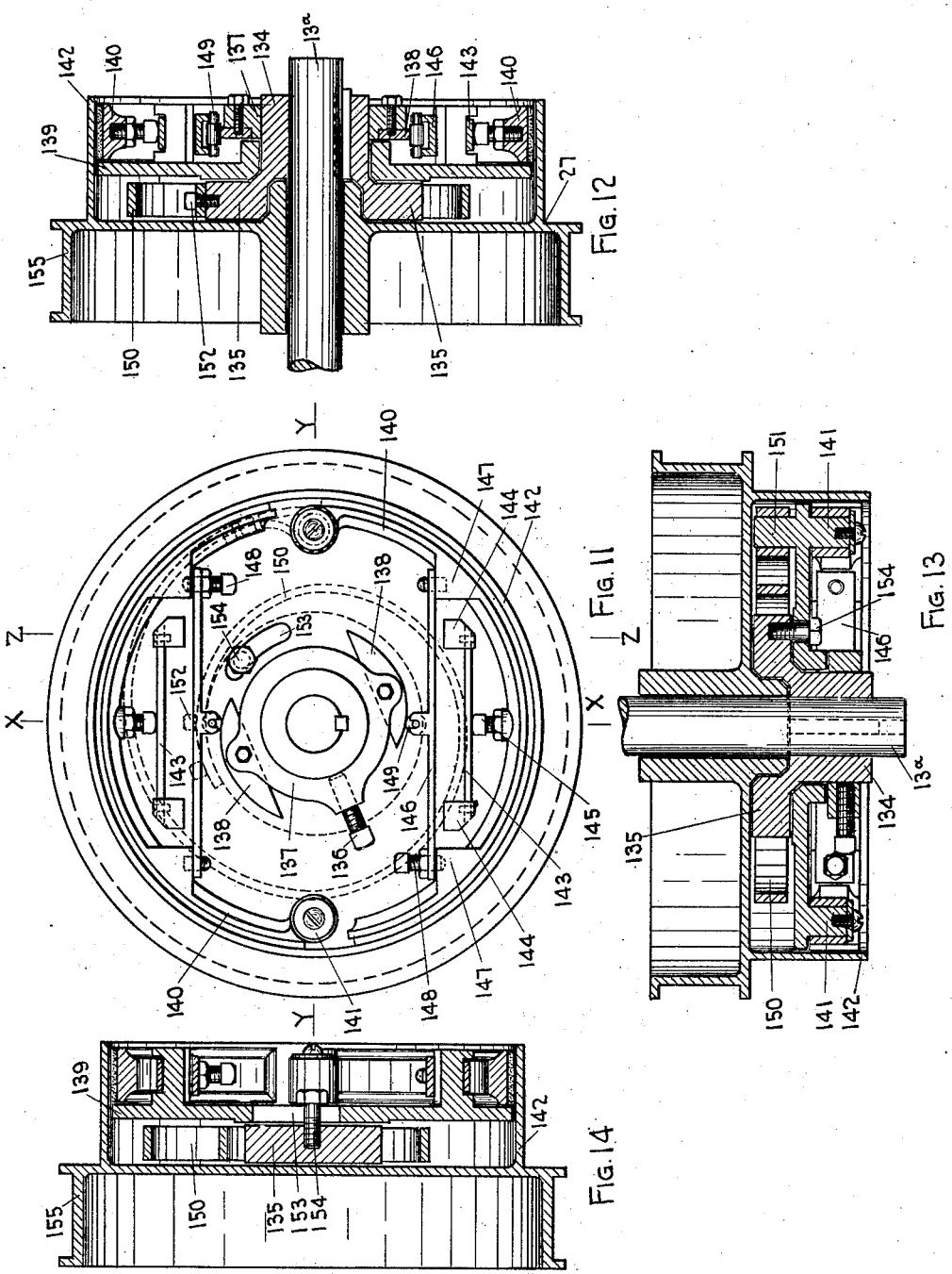

A. MORTON.
PILE CUTTING MACHINE.
APPLICATION FILED APR. 15, 1907.
1,016,512.
Patented Feb. 6, 1912.
8 SHEETS—SHEET 8.
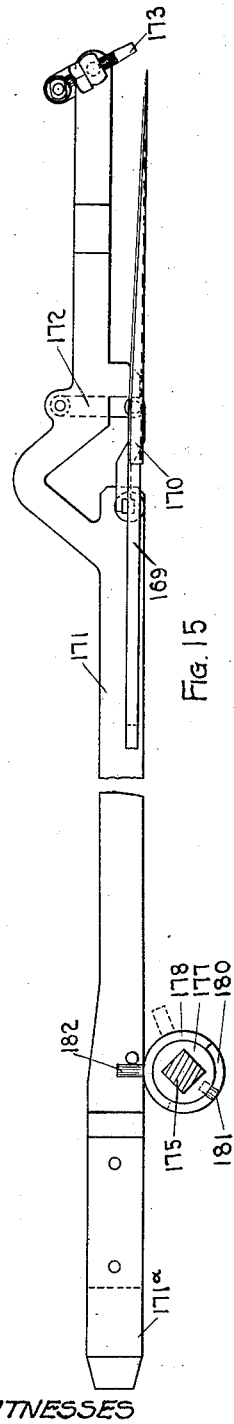
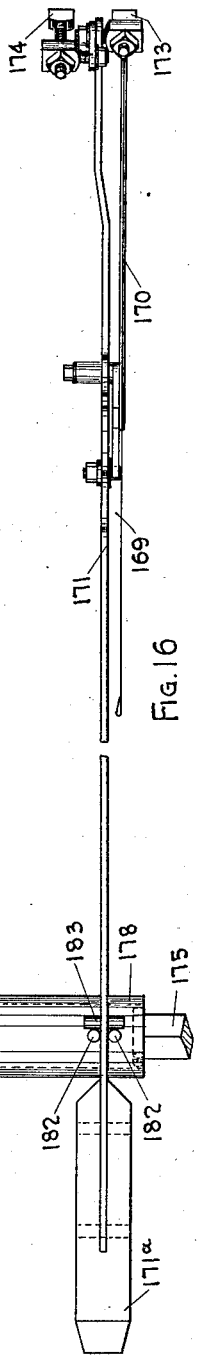
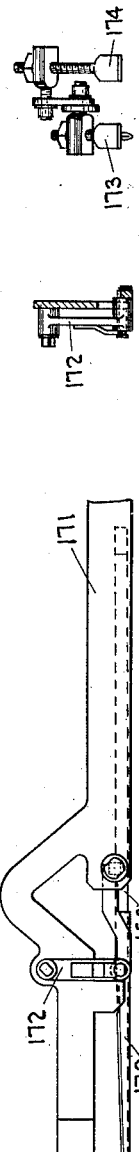
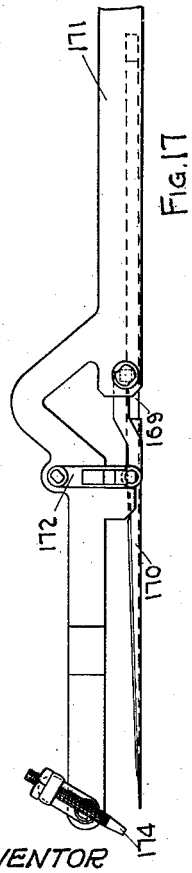
WITNESSES
INVENTOR
Arthur Morton,
BY Wilmarth H. Thurston,
ATTORNEY though it is operative, has not been practically successful.

UNITED STATES PATENT OFFICE.

ARTHUR MORTON, OF WARWICK, RHODE ISLAND, ASSIGNOR TO CROMPTON COMPANY, OF PROVIDENCE, RHODE ISLAND, A CORPORATION OF RHODE ISLAND.

PILE-CUTTING MACHINE.

1,016,512.  Specification of Letters Patent.  Patented Feb. 6, 1912.

Application filed April 15, 1907. Serial No. 368,329.

*To all whom it may concern:*

Be it known that I, ARTHUR MORTON, of Warwick, in the county of Kent and State of Rhode Island, have invented certain new and useful Improvements in Pile-Cutting Machines, (Case A;) and I do hereby declare the following specification, taken in connection with the accompanying drawings, forming a part of the same to be a full, clear, and exact description thereof.

The invention relates to a machine for cutting the race or pile of pile fabrics, such as velvets, corduroys, etc. Machines have heretofore been constructed in which the fabric in the form of an endless web has been traveled past one or more cutting knives, but such machines have been practically adapted only for the cutting of corduroys, and were not, so far as I am aware, practically adapted for cutting velvets.

While both velvets and corduroys are woven with what are known as races, which require to be cut in finishing the fabric, velvets and corduroys differ from each other in several material respects, by reason of which differences it is a matter of much greater difficulty to cut the races of velvets by machine than is the case with corduroys. In the first place in corduroy the races are comparatively large, while in velvets the races are very small, and in fact are in many cases so small as not to be readily seen by the inexperienced eye. In the next place the weave of a velvet is materially different from the weave of a corduroy, one result of this difference in weave being that the races in corduroy are well defined, the threads of each race being all anchored in the same line, whereas in the velvet weave, the threads of adjacent races overlap, and so that the threads of one race are anchored within the area of adjacent races, with the result that the races are not clearly defined.

By reason of the smallness of the races in velvet and of the character of said races due to the peculiarity of weave referred to, the cutting of velvet is a much more difficult and delicate operation than the cutting of corduroy, and much greater care is required both to insert the knife in the proper race and also to keep the knife in the race after it has been inserted. By reason of these facts it has been found that machines, which were adapted for cutting corduroy, and which have proven practically successful in such work, were wholly unadapted for cutting velvets and could not be practically employed for that purpose, with the result that heretofore, so far as I am aware, the cutting of velvets has been practically all done by hand, with the fabric stretched upon stationary supports, and with a hand-knife moved along the fabric by the operator traveling from one end of the stretched fabric to the other. The expense of this hand cutting is necessarily very great.

The object of the present invention is to provide a machine which is adapted for the cutting of velvets, and which may be employed for that purpose in place of the tedious and expensive hand cutting heretofore necessary.

One feature of the invention consists in providing means for traveling the fabric past the cutting knife and for maintaining a proper and suitable tension on the fabric at the point where it is being cut, the maintenance of such a proper tension being very important for the successful cutting of velvets by machine.

The machine herein described is provided with a support and guides for the knife. The knife, however, is always under the direct control of the operator, and it is therefore not necessary to provide a stop-motion for automatically stopping the machine, if the knife happens from any cause to slip out of the race. The knife, however, is so constructed that, if the point of the knife should project through the back of the fabric, the knife will be tripped and turned over, thereby limiting the extent of the damage done to the fabric.

If the knife slips out of the race, or projects through the back of the fabric, so that the knife requires to be reëntered in the race being cut, the fabric will, before the operator can stop the machine, have traveled a greater or less distance, and so as to carry the point where the cutting of the race ceased beyond the point of the knife. A further feature of the invention therefore consists in providing means for feeding or traveling the fabric backward the distance necessary to bring the partially cut race to a position where the knife can be properly reëntered therein, and thereby save the necessity, of traveling the entire web of fabric around in a forward direction, as would otherwise be required.

As the fabric is passed through the machine in the form of an endless web formed by uniting the two ends of the fabric, which results in the formation of a seam or bunch at the point of union, through which the knife cannot pass, it is desirable that the machine shall be stopped before such seam or bunch reaches the knife. A further feature of the invention consists in providing means for automatically stopping the machine, and thus stopping the feed of the fabric, when the seam or bunch referred to approaches the knife. When the machine is to be thus automatically stopped, it is desirable that it shall be stopped promptly and quickly, and for this purpose means are provided for not only disconnecting the power, but for also applying a brake to some rotary part of the fabric feeding mechanism. The fabric feeding mechanism embodies two rolls located at some distance apart between which rolls the cutting of the race takes place, and between which rolls, therefore, it is necessary that the proper tension shall be maintained. The forward one of these two rolls is a feed-roll which serves to draw the fabric forward, while the rear roll is a drag-roll adapted to put a certain amount of drag upon the fabric tending to resist the forward pull thereof, and by means of which drag-roll the necessary tension is put on the fabric at the cutting point.

When the machine is quickly stopped, as it is by the brake referred to, it frequently happens that the forward or feed roll will run forward a certain distance under its momentum, and will then rebound, which has the effect to produce a certain amount of slack between the two rolls, which slack requires to be taken up and the fabric again put under tension to enable the knife to be entered in the race and the cutting proceeded with. A further feature of the invention consists in providing means for taking up the slack in the fabric, whenever the same occurs, and for restoring the proper tension to the fabric at the cutting point.

The stop-motion employed in the machine shown in the drawings is an electric stop-motion. It is necessary, when such stop-motion has operated, that the operating parts thereof shall be reset in their normal position. A further feature of the invention consists in providing means for automatically resetting the operating parts of such stop-motion.

The invention further consists in the construction, combinations and arrangements of parts hereinafter described and claimed.

Figure 5:
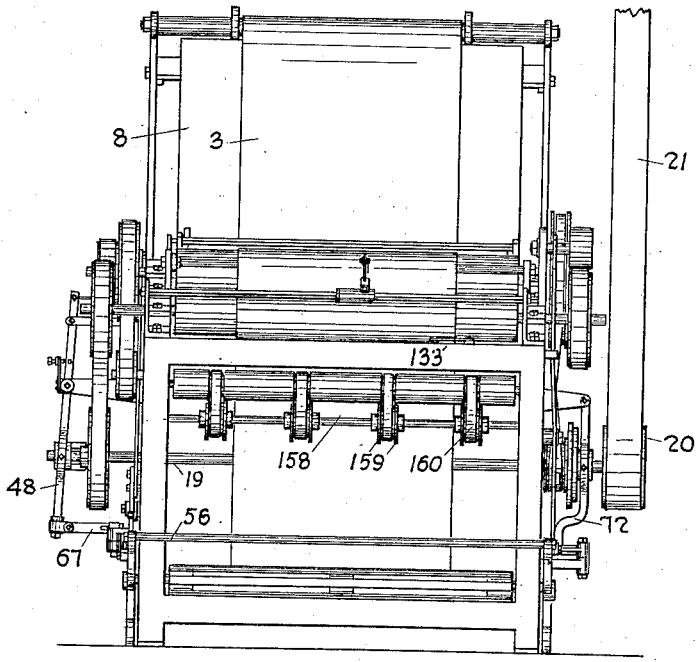

Referring to the drawings, Figure 1 is a plan view of the machine. Fig. 2 is a side elevation of the right hand side of the machine looking from the front. Fig. 3 is a side elevation of the opposite side of the machine. Fig. 4 is a longitudinal section through the machine with certain of the parts omitted and showing the travel of the fabric through the machine. Fig. 5 is a front elevation of the machine. Fig. 6 is a side elevation of the front portion of the machine looking from the left hand side on a somewhat larger scale than Fig. 3. Fig. 7 is a plan view of Fig. 6. Figs. 8 and 9 are end elevations of the left hand end of Fig. 6 showing the parts in different positions. Fig. 10 is a view of a portion of Fig. 6 showing the parts in different positions. Figs. 11, 12, 13 and 14 are detail views on an enlarged scale of the friction device for putting tension on the fabric, etc., Fig. 12 being a section on line x—x; Fig. 13 being a section on the line y—y; and Fig. 14 being a section on the line z—z, Fig. 11. Fig. 15 is a side elevation, and Fig. 16 a plan view of the knife and knife-holder. Fig. 17 is a side elevation of the opposite side of the knife and a portion of the knife-holder. Figs. 18 to 27 inclusive are detail views of certain parts.

The machine comprises a suitable frame 1 in which the several operating parts are mounted. The fabric travels through the machine in the form of an endless web. The knife 2 is located at the front of the machine, and the fabric 3, after the race has been cut, is carried down on to a traveling endless apron or lattice 4 at or near the bottom of the machine where it drops in folds, and in this form is carried by the traveling apron to the rear of the machine. From the apron at the rear of the machine the fabric is carried up over a feed-roll 5 and down an incline 6. At the foot of this incline the fabric turns upward and is carried over two fixed bars 7, 7, at the top of the frame. Preferably the fabric is left more or less loose at the point where its direction is changed from the foot of the incline to the vertical. From the stationary bars 7, 7, the fabric travels down another incline 8 around an idler roll 9, up over a driven roll 10, preferably rubber-covered, down around another idler roll 11, then forward around a tension-roll 12, and around the drag-roll 13, then under the knife 2, and around the feed-roll 14 and the tension-roll 15, thence downward between a pair of supplemental feed-rolls 16, 17, the feed-roll 16 being a driven roll and the feed-roll 17 being an idler roll, and thence down on to the traveling apron 4 above referred to. Preferably a stationary bar 18 is arranged between the drag-roll 13 and the feed-roll 14 in front of the free end of the knife for the purpose of supporting the fabric at or adjacent to the cutting point. This supporting bar is made adjustable toward and from the knife, as shown in Fig. 4.

The necessary tension on the fabric at the cutting point is produced by means of the rolls 13 and 14. The feed-roll 14 is positively driven, while the drag-roll 13 is provided with a friction-device to be hereinafter described, whereby a friction or drag may be put on said roll.

The main driving-shaft 19 is provided with a pulley 20 driven by a belt 21 from an overhead countershaft. On the opposite end of the driving-shaft 19 is a pulley 22 from which a belt 23 extends to a pulley 24 on the left hand end of the positively driven feed-roll 14. On the driving-shaft 19, adjacent to the main driving-pulley 20, is a pulley 25, from which a cross belt 26 extends to a loose pulley 27 on the drag-roll 13. The pulley 27 is a two-step cone-pulley and from the smaller step of said pulley a belt 28 extends to a pulley 29 on the right hand end of the feed-roll 14. The pulley 27 on the drag-roll 13 is somewhat larger than the pulley 29 on the feed-roll 14, and so that said pulley 27 rotates at a slower speed than the pulley 29.

On the left hand end of the drag-roll 13 are two pulleys 30 and 31 as shown in Fig. 1. From the pulley 30 a belt 32 extends around a pulley 33 on the left hand end of the supplemental feed-roll 16. From the pulley 31 a belt 34 extends to a pulley 35 on the left hand end of the roll 10. On the right hand end of said roll 10 are two pulleys 36 and 37. From the pulley 36 a belt 38 extends to a pulley 39 on the right hand end of the feed-roll 5. From the pulley 37 a belt 40 extends to a pulley 41 on a stud 42, on which stud is a second pulley 43 from which a cross belt 44 extends to a pulley 45 on a shaft 46 at the rear end of the machine. Said shaft 46 is the feed-shaft for the endless traveling apron 4. The pulley 22 on the driving-shaft 19 is loose on said shaft, but is adapted to be connected with said shaft by a suitable clutch-mechanism, preferably a friction-clutch, as shown in the drawings. This clutch may be of any desired construction and as it forms no part of the present invention, the detailed construction of the clutch shown need not be described.

It will be understood that when the pulley 22 is connected with the driving-shaft 19, the fabric will be fed through the machine and when the pulley 22 is disconnected from the shaft 19, the feed of the fabric will be stopped.

The clutch-mechanism as a whole is designated as 47 in the drawings, and said clutch-mechanism is adapted to be operated by the lever 48.

In machines of this character it is desirable that when the driving power is disconnected for the purpose of stopping the machine, the machine should be quickly brought to a full stop, and so as to promptly stop the feed of the fabric. For this purpose a brake-mechanism is applied to some part of the feed-mechanism to quickly stop the feed of the fabric whenever the driving power is disconnected.

In the arrangement shown the brake is applied to the drag-roll 13, or rather to the pulley 30 on said roll. This brake may be of any suitable construction, and in the drawings is shown as comprising a pivoted brake-shoe 49, which is designed to be forced into contact with the inner surface of the flange of the pulley 30 by means of a coiled spring 50. The brake-shoe 49 has a pivot-pin rigidly secured thereto, which pivot-pin is mounted to turn in a socket 49$^a$ carried by a bracket secured to the frame of the machine, as shown in Fig. 7. The brake-shoe 49 is normally, or while the machine is in operation, latched out of contact with the pulley-flange. Connected to the free end of the brake-shoe is a vertical bar 51 which extends downward and is supported and guided by a bracket 52 extending from the frame of the machine. Adjustably secured to one side of this bar 51 is a notched block 53 adapted to engage or be engaged by the forward end of a movable bar 54. One end of the spring 50 is connected to said bar 51, the other end of said spring being connected to a bracket 55 on the frame. When the machine is running the bar 51 is latched and held in its upper position, and so as to hold the brake-shoe 49 out of contact with the flange of the pulley 30 by the end of the movable bar 54 engaging the notched block 53. When, however, said movable bar 54 is moved rearward by any suitable means, the bar 51 is thereby unlatched and is pulled downward by the spring 50, thereby forcing the brake-shoe into contact with the flange of the pulley 30, thereby stopping the feed of the fabric.

In the machine shown means are provided for automatically throwing out the clutch 47, and for automatically applying the brake 49, which means will be hereinafter described.

The means for releasing the brake and starting the machine to feed forward the fabric after the machine has been stopped and the brake applied will be next described. A foot-treadle 56 extends across the front of the machine where it may be conveniently operated. This treadle is secured by means of arms 57, one on each side of the machine, to a rock-shaft 58 which extends across the machine and is arranged to turn in bearings in the frame. Connected to this rock-shaft are two weights 59, one on each side of the machine, which act to normally hold the treadle 56 in its upper position. Secured to the rock-shaft 58 is an arm 60, to which is connected one end of a connecting rod 61, the other end of which rod is connected to one arm of a bell-crank lever 62 which is pivoted on the frame. The other arm of this bell-crank lever is provided with a friction-roll 63 which underlies the lower end of the vertical bar 51 which is connected to the brake-shoe. When the bell-crank lever 62 is rocked by depressing the treadle 56, one result will be to lift the brake-shoe 49 out of contact with the flange of the pulley 30 and thus release the brake.

Connected to the arm of the bell-crank lever 62 to which the rod 61 is connected is another connecting rod 64, the opposite end of which is connected to one arm of a bell-crank lever 65, which is pivoted on a bracket 66 projecting from the frame of the machine. The other arm of the bell-crank lever 65 is connected by a link 67 with the lower end of the clutch-lever 48. When, therefore, the treadle is depressed and the bell-crank lever 62 is rocked, the further result will be that the bell-crank lever 65 will be correspondingly rocked, and this in turn will serve to pull inward the lower end of the clutch-lever 48 and thus throw in the clutch 47 and connect the pulley 22 to the driving-shaft 19. Pivoted to the clutch-lever 48 is a latch-bar 68, provided with a shoulder 69, adapted to engage a bracket 70, through a slot in which bracket the end of the latch-bar 68 extends. When the clutch 47 is thrown in to connect the pulley 22 with the shaft 19, the upper end of the clutch-lever 48 is moved away from the bracket 70, and so as to draw the latch-bar 68 outward and into a position where the shoulder 69 on said latch-bar will engage said bracket, and thereby latch and hold the clutch in its engaged position. The weight of the latch-bar 68 will ordinarily be sufficient to cause said bar to fall down and engage the latch. If desired, however, a spring may be employed for this purpose.

It is desirable in machines of this character to provide means to reverse the machine and the feeding of the fabric, in order that if the knife should fly out of the race, or any other accident happen, the fabric may be run back a short distance for the purpose of reinserting the knife in the race. This reversal of the machine is effected by means of the cross-belt 26 running on one of the steps of the cone-pulley 27 on the drag-roll 13. This cross-belt 26 is operated by the pulley 25 which is loose on the main driving shaft 19, but which is provided with a clutch 71 adapted to be operated by a lever 72 for clutching said pulley to said driving shaft. The means for operating this clutch 71 are as follows: pivoted to the frame of the machine at the forward end thereof is a hand-lever 73, the handle of which is in convenient position to be grasped by the operator. The lower end of this lever is connected by a link 74 to an arm 75 projecting from a rock-shaft 76 which extends across the machine and is mounted in bearings in the frame. The lower end of the arm 75 is connected by a link 77 to one arm of a bell-crank lever 78 which is pivoted on a bracket 79 secured to the frame of the machine. The other end of this bell-crank lever 78 is connected to the lower end of the clutch-lever 72, which clutch-lever is pivoted at its other end to the frame. With this construction, as will be seen, when the upper end of the hand-lever 73 is pushed rearward, the result will be, through the operation of the connecting parts, that the clutch will be thrown in and the pulley 25 thus connected to the driving shaft 19, and so as to drive the drag-roll 13 in the reverse direction.

As when the machine is stopped the brake is on, it is necessary whenever it is desired to start the machine in the reverse direction that the brake should first be thrown off. It is for this purpose that the rock-shaft 76 is extended across the machine, and this rock-shaft is provided at its opposite end with an arm 80 which underlies a friction roller 81 on the vertical bar 51, which is connected with the brake-shoe 49 which engages the flange of the pulley 30 on the drag-roll. Consequently whenever the rock-shaft 76 referred to is rocked by pushing rearward the hand-lever 73, the rocking of said shaft will serve to lift the brake-shoe 49 out of contact with the pulley-flange and thus release the brake. It is prefererd to provide a certain amount of lost motion in the connection between the lower end of the arm 75 and the link 77 in order to insure that the brake shall be released before the reversing clutch is thrown in.

The purpose of the two idler rolls 12 and 15 is to hold the fabric up in contact with the drag-roll 13 and the feed-roll 14 respectively. It is desirable to maintain the axis of each of said rolls 12 and 15 parallel with the axis of its companion roll, and it is also desirable that the grip on the fabric between the feed-roll 14 and its binding-roll 15, and the grip of the fabric between the drag-roll 13 and its binding roll 12, shall be substantially uniform. In order to secure these results the machine is provided with an equalizing device designed to maintain the two binding-rolls 12 and 15 in proper relation with the rolls 13 and 14 respectively.

Each of the rolls 12 and 15 is mounted in movable bearings, these bearings being formed in levers 82, 83, pivoted one at each side of the machine. Referring to Fig. 4, which shows the two levers at one side of the machine, one for each of said rolls, it will be seen that the lever 82 is pivoted to the frame of the machine at 84, and that the lever 83 is similarly pivoted at 85. The roll 12 is mounted in one arm of the lever 82 and its companion lever on the opposite side of the machine, while the roll 15 is mounted in one arm of the lever 83 and its companion lever at the opposite side of the machine. The opposite arms of the levers 82, 83, cross each other as shown. The free ends of said levers are connected by coiled springs 86, 87, with an equalizing bar 88. Connected to the center of this equalizing bar is a cord 89 which extends around the pulleys 90, located one on each side of the machine, and is connected to the center of a corresponding equalizing bar 88 on the opposite side of the machine.

It will be understood that the arrangement of levers, springs and equalizing bar is the same on both sides of the machine. By this construction the upward pressure of the two binding-rolls 12 and 15 produced by the four coiled springs referred to is equalized, and is such that the axis of each binding-roll will be maintained parallel with the axis of its companion roll, and so that each binding roll will also be caused to grip the fabric uniformly throughout the length of said rolls, provided of course the surface of the rolls are uniform and true.

Referring next to the means for automatically throwing out the clutch 47 and for automatically applying the brake 49, which means constitute an automatic stop-motion, such automatic stop-motion, which in the arrangement shown is an electric stop-motion, is designed to be operated by the bunch or seam in the fabric formed by uniting the two ends thereof. Said stop-motion is arranged to be operated by said bunch or seam to automatically stop the machine before said bunch or seam reaches the knife. In the arrangement shown the electric-circuit is an all-wire circuit, and the machine itself forms no part of said circuit.

In order to stop the machine and to apply the brake so as to promptly stop the feed of the fabric, it is only necessary to operate the clutch-lever 48, the operation of which lever, as above described, will serve both to throw out the clutch 47 and to apply the brake 49.

As above described, when the clutch-lever 48 is operated to throw in the clutch 47, said clutch and lever are latched in engaging position by the latch-bar 68, or by the engagement of the shoulder 69 on said bar with the bracket 70. To the upper end of the clutch-lever 48 is connected one end of a coil-spring 91, the other end of which spring is connected to a bracket 92 by means of an adjusting-screw 93. When the clutch-lever 48 is moved to engage the clutch 47, the spring 91 is put under tension, and said spring is held under such tension by the engagement of the latch-bar 68 with the bracket 70. In order to throw out the clutch 47, therefore, it is only necessary to disengage said latch-bar 68 when the clutch-lever 48 will be moved by said spring 91 in the direction to throw out the clutch 47.

The means for automatically disengaging the lever 68 from engagement with the bracket 70 are as follows: Extending across the machine above the fabric, where the fabric comes down the incline 8, is a rock-shaft 94 which carries a flat leaf-spring 95, which spring likewise extends across the machine and normally lies in engagement with the fabric. Pivoted to the bracket 96 is a lever 97 which carries the movable electrode 98 for closing the electric circuit. The fixed electrode 99 is secured to a bracket 100 in line with said movable electrode, said electrodes being insulated from the frame of the machine by insulating the brackets referred to. The lever 97 is provided with a recess having an overhanging lip 101. Secured to the end of the rock-bar 94 is a depending arm 102 provided with a projecting toe 103. The end of the arm 102 lies in the recess in the lever 97, with the toe 103 normally underlying the projecting lip 101, the arrangement of the parts being such that when the toe 103 is thus in engagement with the lip 101, said toe will hold the movable electrode 98 out of contact with the fixed electrode 99. When now the bunch or seam in the fabric reaches the spring 95 said bunch will, in passing under said spring, serve to turn the rock-bar 94, the result of which will be to move the toe 103 on the arm 102 out of engagement with the lip 101 on the lever 97, thereby permitting said lever to fall and thus bring the movable electrode 98 into contact with the fixed electrode 99, thereby closing the electric circuit.

Pivoted on the frame at 104 are two levers 105 lying side by side. As the construction and operation of these two levers and their connecting and coöperating parts is the same, it will be convenient to first describe the construction and operation of one of these levers, and then to explain the reason why two levers are employed. Mounted on the shaft of the driven roll 10 is an eccentric 106 which is connected with the upper end of the lever 105, whereby said lever is vibrated back and forth at each revolution of said shaft.

The bar 54, before referred to, extends lengthwise of the machine, said bar being pivotally connected at one end at the pivoted link 107, and being pivotally connected at its other end to one arm of a bell-crank lever 108. Said bar 54 is thus capable of a lengthwise swinging movement and is adapted to operate said bell-crank lever. Loosely pivoted on the side of the movable bar 54 is a tappet 109 arranged to turn in a vertical plane about its pivot. Normally this tappet 109 is held in a horizontal position and with its forward end out of the path of the vibrating lever 105 by means of a toe or arm 110 on a rock-shaft 111 pivoted in a lug depending from the movable bar 54. Projecting from the rock-shaft 111 is an arm 112, the end of which is connected by a rod 113 with the pivoted armature 114 of an electro-magnet 115 in the electric circuit referred to. When now the electric circuit is closed by the falling of the lever 97 and the electro-magnet is thus energized, the pivoted armature 114, as it is drawn toward the coils of the magnet, will pull downward the connecting rod 113 and will thus rock the shaft 111 so that the toe 110 thereon will be moved into line with a notch or recess 116 in the tappet 109, and so that said tappet may turn upon its pivot under the action of gravity, as shown in Fig. 10 thereby raising the right hand end of said tappet into the path of the vibrating lever 105. When the right hand end of the tappet 109 is thus raised into the path of the vibrating lever 105, said lever in its movement will serve to move the tappet and the movable bar 54, to which the tappet is pivoted, to the left in Fig. 10. The other arm of the bell-crank lever 108 projects through an inclined slot or cam-slot 119 in the latch-bar 68, pivoted to the clutch-lever 48.

When the clutch 47 is in position to engage the pulley 22 with the shaft 19, the arm of the bell-crank lever 108 lies at the bottom of the inclined slot 119. When now the tappet 109 and movable bar 54 are moved rearward by the vibrating lever 105, the bell-crank lever 108 will be turned so as to cause the arm of said lever to travel up the inclined slot 119, the wall of which slot constitutes in effect a cam-surface, the result of which will be to disengage the latch-bar 68 from the bracket 70, whereupon the spring 91 will serve to operate the clutch-lever 48 to throw out the clutch 47, thereby disconnecting the pulley 22 from the driving-shaft 19 and stopping the machine.

The purpose in employing two levers 105 and two tappets 109 is to insure greater promptness in stopping the machine. Thus with the eccentrics 106, which operate the levers 105, set opposite to each other, the lower ends of said levers will always be moving in opposite directions, and so that one of said levers will always be moving in a direction to engage its tappet.

The electric circuit is as follows: Leading from the fixed electrode 99 is a wire 120 which leads to and is connected with a pin or electrode 121 on the clutch-lever. Secured to the bracket on which the clutch-lever is pivoted is a spring-electrode 122, this spring electrode and the electrode 121 on the clutch-lever being in contact, and thus in electrical connection, when the clutch-lever is in the position it occupies when the clutch is thrown in to connect the pulley 22 with the driving-shaft 19. Leading from the spring-electrode 122 is a wire 123 which leads to the battery 124. The wire 125 leading from the battery is connected with one end of the coil of the electro-magnet 115, and the wire 126 from the other end of the magnet coil leads to the movable electrode 98. It is to be understood that all the electrodes are suitably insulated from the frame and other parts of the machine.

Another feature of the invention consists in means whereby the parts of the stop-motion mechanism are automatically reset after the stop-motion mechanism has operated. Means for thus automatically resetting the parts of the stop-motion mechanism are as follows: As above explained, when the electric circuit is closed by the release and fall of the movable electrode 98, the clutch-lever 48 is automatically thrown over by the spring 91 secured thereto. This has the effect to immediately break the electric circuit by moving the electrode 121 on the clutch-lever out of contact with the electrode 122, and this breaking of the circuit deenergizes the electro-magnet 115, and leaves the rock-shaft 111 which carries the toe 110 free to be returned to its normal position under the action of a weighted member 127 secured thereto. Secured to the frame is a bracket 128 having a projecting arm which lies in the path of the pivoted tappet 109, and the rear end of said tappet is mounted or beveled, so that as the bar 54 moves rearward the beveled end of the tappet, coming in contact with the arm of the bracket 128, will cause said tappet to be lifted, thus lifting the notch 116 in the tappet clear of the toe 110, and so that said toe under the influence of the weighted member 127 on the rock-arm will be turned to its normal position where it will engage the lower surface of the tappet and thus hold said tappet in its normal horizontal position. By this means the pivoted tappet is reset in position for the next operation of the automatic stop mechanism. A stop-pin 129 limits the movement of the tappet 109 in thus resetting the same.

Connected to the lever 97 which carries the movable electrode 98 is a downwardly extending bracket 130, the short arm of which overlies the horizontal arm of the bell-crank lever 108, which is connected to the end of the bar 54. When the movable bar is moved to the rear for the purpose of unlatching the clutch-lever 48 to stop the machine, this movement in turning the bell-crank lever 108 will, by the engagement of the horizontal arm of said bell-crank lever with the bracket 129 cause the lever 97 to be raised to its normal position, thereby separating the electrodes 98 and 99. Connected to the rock-shaft 94 is a spring 131 which bears upon the inclined surface 8 which will serve, when permitted to do so, to move the toe 103 of the lever 102 into its normal position beneath the projecting lip 101 on the lever 97. Thus these parts of the automatic stop mechanism are likewise automatically and immediately reset.

As will appear from what is above stated, the electric-circuit is first closed by the contact of the main electrodes 98 and 99, and then is almost immediately broken again by the separation of the secondary electrodes 121 and 122.

For the purpose of stopping the machine and applying the brake by hand there is a branch electric circuit 132 connected with the main circuit and leading therefrom to a circuit-closer or switch 133 located at the front of the machine at a point where it will be convenient to the operator. This circuit-closer may be in the form of a simple push button or other switch for conveniently closing the circuit at that point. With this arrangement, when it is desired to stop the machine by hand, the operator has simply to close the switch 133 which will serve to energize the electro-magnet 115, and cause the operation of the stop mechanism in precisely the same way as though the circuit had been automatically closed by the bunch or seam in the fabric.

As above stated, the cone-pulley 27 on the drag-roll 13 is not rigidly secured to said roll, but is instead loose on the shaft of said roll, and is connected with said roll by means of a friction device whereby a friction or drag is put on said drag-roll 13. The construction of this friction device and the connection between the pulley 27 and the shaft of the drag-roll 13 will next be described.

Referring to Figs. 11 to 14, in which the parts are shown upon an enlarged scale, 13ª represents the shaft of the drag-roll 13, on which the cone-pulley 27 is loosely mounted. Keyed to the shaft 13ª is a hub 134 provided with a flange 135. Secured to the hub 134 by a set screw 136 is a collar 137. In suitable slots formed at opposite points on said collar are secured two cams 138. Mounted loosely on the hub 134 is a disk 139 to which are pivoted at opposite points two brake-shoes 140, said brake-shoes being pivoted at 141, as shown in Fig. 11. Said brake-shoes 140 are arranged to bear against the inside of the flange 142 which forms the smaller step of the cone-pulley 27. Said brake-shoes 140 are pressed outward against the flange 142 by flat springs 143, one for each brake-shoe. Each of said springs 143 is mounted in lugs 144 secured to the disk 139. Mounted in each brake-shoe is an adjusting-screw 145 against which the spring 143 bears, and by means of which screw the desired tension is set up in said spring 143.

In addition to the springs 143 additional flat springs 146 are employed, one for each brake-shoe. Each of said springs 146 is secured to lugs 147 formed on the brake-shoe, said spring being rigidly secured to one of said lugs and being connected to the other lug by means of an adjusting-screw 148. Each of said springs 146 is provided with a friction-roll 149 mounted in suitable ears formed on said spring and arranged to engage the corresponding cam 138.

The disk 139 and the brake-shoes 140 carried thereby are connected to the flange 135 of the hub 139 by means of a convolute spring 150, one end of said spring being secured to a stud 151 carried by the disk 139, and the other end of said spring being connected to the flange 135 by means of the screw 152. As the hub 134 is keyed to the shaft 13ª, the convolute spring 150 thus serves to connect the disk 139 and the brake-shoes 140 with said shaft 13ª and with the drag-roll 13 secured thereto. In the disk 139 is formed a segmental slot 153 through which extends a pin or bolt 154 projecting from the flange 135.

The friction device above described, including the connections between the cone-pulley 27 and the drag-roll 13 serves not only to put a drag on said roll 13 and thus to produce the desired tension on the fabric between said drag-roll 13 and the feed-roll 14, and thus at the cutting point, but also serves to automatically take up any slack that may occur and so as to automatically restore the desired tension at this point. Said friction device further serves to transmit motion to the drag-roll 13 to feed the fabric backward when the pulley 27 is rotated in the reverse direction by the cross-belt 26.

The larger step 155 of the cone-pulley 27 is of larger diameter than the pulley 29 on the feed-roll 14. If desired, the pulley 29 may be fast on the shaft of the feed-roll 14. It is preferred, however, to mount said pulley loosely on said shaft and to connect it therewith by means of a pawl 156 and a ratchet-wheel 157, said pawl being mounted on and carried by the pulley 29, and said ratchet-wheel being secured to the shaft of the feed-roll 14, as shown in Fig. 2.

The operation of the parts above described is as follows: It will be understood that the fabric to be cut, in passing around the drag-roll 13 and the feed-roll 14, constitutes in effect a belt connecting said rolls, and so that with the feed-roll 14 positively rotated, as it is, from the main driving-shaft, the drag-roll 13 will be rotated from the feed-roll 14 by the fabric acting as a belt. As the cone-pulley 27 is connected with the drag-roll 13 by the convolute spring 150 and the brake-shoes 139 of said pulley, the rotation of the drag-roll 13 by the fabric will impart rotation to the cone-pulley 27. As the step 142 of said cone-pulley 27 is larger in diameter than the pulley 29 with which it is connected by the belt 28, the tendency will be to rotate said pulley 29 at a greater speed than the cone-pulley 27 is rotated, but said pulley 29 is prevented from rotating at such greater speed by the engagement of the pawl 156 with the ratchet-wheel 157, the speed of rotation of said ratchet-wheel being limited to the speed of rotation of the feed-roll 14. The result is that as the pulley 29 cannot rotate as fast as the cone-pulley 27 is trying to rotate it, said cone-pulley 27 is retarded in its rotation, such retarding of the pulley 27 being permitted by the yielding of the convolute spring 150 and by the slipping of the brake-shoe 140 on the flange 142 of the pulley 27. The frictional slipping of of the brake-shoes 140 on the flange 142 of through the intervening connections, a drag on the roll 13 and causes it to lag behind the feed-roll 14, which thus puts the desired tension on the fabric between said roll. It will be understood that in the operation above described the friction between the brake-shoes 140 and the flange 142 is produced by the tension of the flat-springs 143, ordinarily supplemented to a greater or less extent by the spring 146.

It will be further seen that the rotation of the pulley 27 from the roll 13 through the dragging action of the brake-shoes serves, notwithstanding that there is a certain amount of slip between the brake-shoes and the pulley 27, to set up a certain amount of tension in the convolute spring 150, and so that said convolute spring constitutes a give-and-take device between the roll 13 and the pulley 27.

When the machine is quickly stopped by throwing out the main clutch 47 and applying the brake 49, the feed-roll 14 is liable to overrun more or less and then rebound, such rebounding of the roll serving to produce slack in the fabric between the roll 13 and the roll 14. If this happens the reaction of the convolute spring 150 will through the engagement of the brake-shoes with the flange 142, serve to rotate the pulley 27 a certain distance in the forward direction, which rotation of said pulley 27 will in turn, through the belt 28, serve to rotate the pulley 29 and the feed-roll 14 so as to take up such slack. If on the other hand there is no rebound of the front roll, then the convolute spring will, by its tendency to turn the feed-roll forward, serve to maintain the tension on the fabric while the machine is stopped.

If now it be desired to reverse the feed of the fabric, as for example if the knife accidentally runs out of the race and so that it becomes necessary to reënter the same, the main clutch 47 is thrown out and the reversing clutch 71 is thrown in, which will have the effect to rotate the cone-pulley 27 in the reverse direction by means of the cross-belt 26. When this happens the rotation of said pulley 27 in such reverse direction is transmitted through the brake-shoes in engagement with the flange 142 and through the connecting convolute spring 150 to the roll 13. It will be understood that the frictional engagement of the brake-shoes with the flange 142 for the purpose of thus transmitting the rotation of the pulley 27 to the roll 13 is set up and maintained by the tension of the springs 143. It will be further seen that when the roll 13 and its shaft $13^a$ are thus rotated in the reverse direction, the hub 134 and the collar 137 secured thereto will be turned in a direction to force the cams 138 against the friction-rolls 149 so as to set up tension in the supplemental springs 146, which will have the effect to correspondingly increase the friction between the brake-shoes 140 and the flange 142 and so as to thereby further insure that the power transmitted from the pulley 27, when thus rotated in the reverse direction to the roll 13 will be sufficient not only to rotate said roll in the reverse direction, but also to draw the fabric with it so as to give the desired backward feed to said fabric. It will be noted that during this backward feed of the fabric the roll 14 will offer no substantial resistance thereto, because at this time said roll 14 will be free to turn loosely in the reverse direction by reason of the fact that the speed of the pulley 29, being greater than that of the pulley 27, will carry or rotate the pawl 156 ahead of the ratchet-wheel 157 and so that the rotation of the roll 14 in the reverse direction will not be prevented or in any way interfered with by said pawls 156.

By reason of the electrification of the fabric in passing rapidly through the machine and over the rubber covered rolls therein, the fabric will have the tendency to cling to one or the other of the supplemental feed-rolls 16, 17, which are located below the main feed roll 14, and it is desirable to provide means to prevent this, and to insure the fabric's being conducted downward to the traveling apron.

In order to prevent the fabric from clinging to the idler roll 17, a shaft 158 is arranged in proximity to said idler roll and parallel therewith, which shaft is provided with any desired number of loose pulleys 159 from each of which pulleys a belt 160 extends around the idler roll 17. As will be seen, these belts constitute blocks in the path of the fabric, and serve to prevent the fabric from winding upon said idler roll and cause it to travel in its proper path downward on to the traveling apron.

If desired, a similar shaft and belt arrangement may be employed in connection with the positively driven supplemental feed-roll 16, but it has been found sufficient in order to prevent the fabric from winding up upon this roll to simply drive said roll at a somewhat greater speed than the fabric itself is traveling. This will serve to prevent the fabric from clinging to or being wound upon such driven roll 16. The driven roll 16 is preferably a rubber covered roll and the idler roll 17 is preferably a wooden roll. In order to secure a yielding grip upon the fabric by these supplemental feed-rolls, the idler roll 17 is preferably yieldingly mounted. The driven roll 16 is mounted in bearings formed in brackets 161 which extend rearward from the front standard of the machine. Extending downward from each of these brackets is an arm 162 in which a bell-crank lever 163 is pivoted, there being one of these bell-crank levers at each side of the machine. The idler roll 17 is mounted in bearings formed in the upwardly extending short arms of these two bell-crank levers, and to the end of each of the long arms of said bell-crank levers a spiral spring 164 is connected, the other end of said spring being connected to the frame or other rigid support. By this construction the idler roll 17 is held in yielding contact with the fabric as it passes between the two rolls, and this allows the bunch or seam to pass between said rolls.

Figure 26:
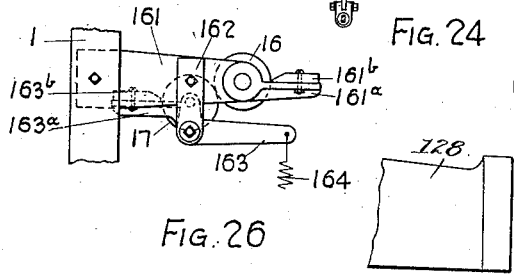
Figure 27:
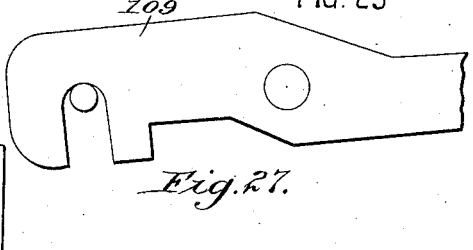

In Fig. 26 is shown a modified construction for preventing the fabric from clinging to either of the rolls 16, 17. Each of the brackets 161 in which the roll 16 is mounted is provided with a forward extension 161ª and to these extensions is secured a board 161ᵇ extending across the machine. The forward edge of this board which is preferably beveled as shown is arranged in proximity to the roll 16 and will serve to prevent the fabric from being carried around by said roll. Each of the bell-crank levers 163 is provided with a similar extension 163ª and to these extensions is secured a board 163ᵇ extending across the machine. The rear edge of this board, which is likewise preferably beveled, is arranged in proximity to the roll 17 and will serve to prevent the fabric from being carried around by said roll.

As hereinbefore stated, after the fabric has traveled upward at the rear of the machine and over the roll 5, it travels downward on an inclined supporting surface 6, and then turns and travels in a vertical direction to and over the cross-bars 7, 7. It is desirable to guide the fabric during this vertical portion of its travel, and for this purpose the machine is provided with a pair of wooden guide-pieces 165, which are constructed to be adjustable toward and from each other to accommodate different widths of fabric. Each of these guide-pieces 165 is secured to a bracket 166, and the two brackets 166 are slidably mounted on two cross-bars 167 which extend across the machine and are supported in the vertical standards 168 forming a part of the frame.

The knife 169 is mounted in a guide 170, which guide is suspended from the holder 171 by means of a link 172, as usual. Said knife-holder 171 is preferably provided with a suitable handle 171ª as shown. Adjustably mounted in the forward end of the knife-holder 171 are two guides or supports 173 and 174, located one on each side of the knife-holder, the guide or support 173 being also arranged in line with the knife. These guides or supports 173, 174, and which during the operation of the machine rest upon the upper surface of the fabric, serve as guides in entering the knife in the race, and also serve as supports for the forward end of the knife-holder. Said guides in pressing upon the fabric also serve to properly present the fabric to the knife and facilitate the cutting of the race.

Although the knife is under the control of the operator, means are provided for supporting the knife and for properly locating the knife with relation to the fabric. Extending across the machine at the front end thereof is a bar 175 preferably square in cross-section, which said bar is rigidly supported in brackets 176 secured one to each side of the frame. Slidably mounted on said bar 175 is a sleeve 177, the aperture in which is preferably square in cross-section to fit said bar, and rotatably mounted on said sleeve 177 is an outer sleeve 178. One end of the inner sleeve 177 is provided with a flange 179 against which one end of the sleeve 178 abuts. The opposite end of said outer sleeve 178 is provided with a slot 180, and in the corresponding end of the inner sleeve 177 is secured a pin 181, the end of which projects outward into said slot 180, which pin is secured in place after the outer sleeve 178 has been slipped over the sleeve 177. The outer sleeve 178 is thus held against endwise movement with relation to the sleeve 177 by means of the flange 179 at one end and the pin 181 at the other end. Said sleeve 178, however, as above stated, is capable of a rotary movement with relation to the sleeve 177, the extent of such rotary movement being limited by the engagement of the pin 181 with the end walls of the slot or recess 180. The outer sleeve 178 is provided with two upwardly projecting pins 182 rigidly secured to said sleeve. The knife-holder 171 is provided with a cross-pin 183 adapted to engage the pins 182, as shown in Figs. 15 and 16.

With the construction of knife-holder and the means for supporting and guiding the same above described, the operation of inserting the knife in the race and of manipulating the parts is as follows: When the knife is to be inserted in a race the outer sleeve 178 is turned on the sleeve 177 so as to bring the pins 182 into the position indicated by dotted lines in Fig. 15. With said sleeve 178 in this position the knife-holder 171 may be moved backward and forward by the operator for the purpose of inserting the knife in the race at the proper point, and with the back of the knife-holder resting on said sleeve which thus furnishes a guide or rest for the knife-holder in thus manipulating the same, with said knife held in the proper horizontal position. When the knife has been properly inserted in the race, the knife-holder is pushed forward by the operator far enough to enable the ends of the pins 182 to clear the cross-pin 183 and then the sleeve 178 is turned to bring the pins 182 into the position shown in full lines in Fig. 15. The machine may now be started and when started it will be seen that the thrust of the fabric against the knife is resisted by the engagement of the cross-pin 183 with the pins 182 and by the engagement of the pin 181 with the end of the slot 180, the sleeve 177 being prevented from turning by the square bar 175. As will be seen, the pins 182 also serve to support and hold the knife-holder in proper vertical position, while the engagement of the cross-pin 183 with the pins 182 also serves to locate the knife with relation to the fabric. By sliding the sleeve 177 along the bar 175 the knife-holder may be properly supported in position for cutting successive races.

The operation of the several parts of the machine has been sufficiently described in connection with the description of the construction of the several parts, and the operation of the machine as a whole will be readily understood without further description thereof.

It will be understood that the construction of the several parts of the machine may be varied without departing from the main features of the invention.

It will be seen that the fabric travels directly from the roll 13 to the roll 14, and without any intermediate tension device, and that the desired tension on the fabric at the cutting point is obtained by the coöperation of said rolls 13 and 14, both of which are preferably rubber-covered, and that in providing such tension the roll 14 operates to draw the fabric forward and without any substantial slipping between said roll and the fabric, while the roll 13 has a drag put upon it by the friction-device employed in connection therewith, and thereby tends to hold back the fabric and put a drag or tension thereon. In other words, the speed of the fabric is substantially the same as the speed of the roll 14 and the fabric acts as a belt connecting the driving roll 14 with the driven roll 13. If any slippage takes place, such slippage will be between the roll 13 and the fabric, and will be due to the action of the friction device in tending to hold back said roll.

It will also be seen that by providing the additional driven rolls 5 and 10, which are also preferably rubber-covered, and with said driven roll 10 arranged in proximity to the drag-roll 13, the liability of any sudden or accidental drag being put upon the roll 13 by any obstruction to the feeding of the fabric through the machine, with the resulting rebound of the roll when the obstruction is removed and the fabric released, is prevented. Thus an even and uniform tension on the fabric will be automatically maintained at all times by the action of the friction device and the connecting convolute spring.

As will be further seen, the amount of drag on the roll 13, and consequently the amount of tension on the fabric, is determined by the amount of friction between the brake-shoes 140 and the rim 142 of the pulley 27, and the amount of such friction is primarily determined by the tension of the springs 143 and is automatically controlled and maintained by the coöperation of the cams 138 and the springs 146 acting in conjunction with the convolute spring 150. By adjusting the tension of the springs 143, the tension on the fabric may be varied and adjusted for fabrics of different weights or different widths.

It will be further seen that the friction device employed in connection with the roll 13 constitutes both a friction-brake and a friction-clutch. Thus in maintaining the desired tension on the fabric during the forward feed thereof, said device operates as a friction-brake, while in operating to take up slack in the fabric, as upon the stopping of the machine, and in operating the roll 13 in the reverse direction to feed the fabric backward, said device operates as a friction-clutch.

It will also be seen that in taking up slack in the fabric the convolute spring 150 acts as a spring-motor to operate the feed-roll 14 to take up such slack.

What I claim as my invention and desire to secure by Letters Patent is:

1. In a pile cutting machine, the combination of a positively driven feed roll and a drag roll adapted to be rotated by the fabric and arranged with relation to said feed roll so that the fabric travels directly from said drag roll to said feed roll in an inclined direction and without any intermediate tension device.

2. In a pile cutting machine, the combination of a positively driven feed roll, a drag roll adapted to be rotated by the fabric and arranged with relation to said feed roll so that the fabric travels directly from said drag roll to said feed roll in an inclined direction and without any intermediate tension device, and means for retarding said drag roll to put tension on the fabric between said rolls.

3. In a pile cutting machine, the combination of a positively driven feed roll, a drag roll adapted to be rotated by the fabric and arranged with relation to said feed roll, so that the fabric travels directly from said drag roll to said feed roll in an inclined direction and without an intermediate tension device, and means for frictionally retarding said drag roll.

4. In a pile-cutting machine, the combination of a positively driven feed-roll, a drag-roll adapted to be rotated by the fabric, and rotary means for frictionally retarding said drag-roll to put a tension on the fabric between said rolls.

5. In a pile-cutting machine, the combination of a positively driven feed-roll, a drag-roll adapted to be rotated by the fabric, and rotary means for applying tension to the fabric between said rolls without any substantial slipping of the feed-roll with relation to said fabric.

6. In a pile-cutting machine, the combination of a positively driven feed-roll, a drag-roll adapted to be rotated by the fabric, and rotary means for causing tension to be applied to the fabric by said drag-roll without any substantial slipping of the feed-roll with relation to said fabric.

7. In a pile-cutting machine, the combination of a positively driven feed-roll, a drag-roll adapted to be rotated by the fabric, and rotary means for causing tension to be applied to the fabric by said drag-roll while permitting the fabric to travel with said feed-roll and at substantially the same speed.

8. In a pile-cutting machine, the combination of a positively driven feed-roll, a drag-roll adapted to be rotated by the fabric, and rotary means for regulating the speed of said drag-roll with relation to the speed of said feed-roll to put tension on the fabric without any substantial slipping of the feed-roll with relation to said fabric.

9. In a pile-cutting machine, the combination of a positively driven feed-roll, a drag-roll adapted to be rotated by the fabric, and rotary means for automatically regulating the speed of said drag-roll with relation to the speed of said feed-roll to put tension on the fabric without any substantial slipping of the feed-roll with relation to said fabric.

10. In a pile-cutting machine, the combination of a positively driven feed-roll, a drag-roll adapted to be rotated by the fabric, and a rotary friction-device for varying the speed of said drag-roll with relation to the speed of said feed-roll to put tension on the fabric without any substantial slipping of said feed-roll with relation to the fabric.

11. In a pile-cutting machine, the combination of a positively driven feed-roll, a drag-roll adapted to be rotated by the fabric, rotary devices for frictionally retarding the speed of said drag-roll with relation to the speed of said feed-roll, and means for regulating the relative speed of said rolls to put tension on the fabric without any substantial slipping of the feed-roll with relation to the fabric.

12. In a pile-cutting machine, the combination of a positively driven feed-roll, a drag-roll adapted to be rotated by the fabric, and rotary means for regulating the relative speed of said rolls to put tension on the fabric without any substantial slipping of the feed-roll with relation to the fabric.

13. In a pile-cutting machine, the combination of a positively driven feed-roll, a drag-roll adapted to be rotated by the fabric, rotary means for frictionally retarding the speed of said drag-roll with relation to the speed of said feed-roll to put tension on the fabric, and means for regulating the relative speed of said rolls.

14. In a pile-cutting machine, the combination of a positively driven feed-roll, a drag-roll adapted to be rotated by the fabric, rotary devices for frictionally retarding the speed of said drag-roll, and means for regulating the friction produced by said retarding devices and thereby regulating the relative speed of said rolls.

15. In a pile cutting machine, the combination of a positively driven feed-roll, a drag-roll adapted to be rotated by the fabric, rotary means for retarding the speed of said drag-roll to put tension on the fabric, and means for varying such tension according to the weight or width of the fabric.

16. In a pile-cutting machine, the combination of a positively driven feed-roll, a drag-roll adapted to be rotated by the fabric, rotary devices for frictionally retarding the speed of said drag-roll to put tension on the fabric, and means for regulating the friction produced by said retarding devices according to the weight or width of the fabric.

17. In a pile-cutting machine, the combination of a positively driven feed-roll, a drag-roll adapted to be rotated by the fabric, a friction-device for retarding the speed of said drag-roll, and a spring connecting said friction device and said drag-roll, through which the drag produced by said friction-device is transmitted to said drag-roll.

18. In a pile-cutting machine, the combination of a positively driven feed-roll, a drag-roll adapted to be rotated by the fabric, a friction-device for retarding the speed of said drag-roll, and a spring, one end of which is connected to said friction-device and the other end of which is connected to said drag-roll and through which spring the drag produced by said friction-device is transmitted to said drag-roll.

19. In a pile-cutting machine, the combination of a positively driven feed-roll, a drag-roll adapted to be rotated by the fabric, a friction-device for retarding the speed of said drag-roll, and a convolute spring, one end of which is connected to said friction-device and the other end of which is connected to said drag-roll, whereby said friction-device will be rotated by said drag-roll through said connecting spring.

20. In a pile-cutting machine, the combination of a positively driven feed-roll, a drag-roll adapted to be rotated by the fabric, a pulley loose on said drag roll, a rotary friction-device between said drag roll and said pulley, and means for positively retarding said pulley.

21. In a pile-cutting machine, the combination of a positively driven feed-roll, a drag-roll adapted to be rotated by the fabric, a pulley loose on said drag roll, a friction-device between said drag roll and said pulley, a pulley of smaller diameter connected to said feed-roll by a pawl and ratchet, and a belt connecting said pulleys.

22. In a pile-cutting machine, the combination of a positively driven feed-roll a drag roll, adapted to be rotated by the fabric, a pulley loose on said drag roll, a rotary friction-device engaging said pulley and connected to said drag-roll by a spring, and means for positively retarding said pulley.

23. In a pile-cutting machine, the combination of a drag-roll adapted to be rotated by the fabric, a friction-device for retarding said roll, and a spring adapted to act on said friction-device, the tension of said spring being controlled by said roll.

24. In a pile-cutting machine, the combination of a drag-roll adapted to be rotated by the fabric, a friction-device for retarding said roll, a spring adapted to act on said friction-device, and a supplemental spring arranged to act on said friction-device, the tension of said supplemental spring being controlled by said roll.

25. In a pile-cutting machine, the combination of a drag-roll adapted to be rotated by the fabric, a friction-device for retarding said roll, a spring adapted to act on said friction-device, and a cam carried by said roll for regulating the tension of said spring.

26. In a pile-cutting machine, the combination of a drag-roll adapted to be rotated by the fabric, a friction-device for retarding said roll, a spring acting on said friction-device, and a spring connecting said friction-device with said roll.

27. In a pile-cutting machine, the combination of a drag-roll adapted to be rotated by the fabric, a pulley loose on said roll, a friction-device engaging said pulley, a spring connecting said friction-device with said roll, and means for retarding said pulley.

28. In a pile-cutting machine, the combination of a drag-roll adapted to be rotated by the fabric, a pulley loose on said roll, a friction-device engaging said pulley, a spring acting on said friction-device, a spring connecting said friction-device with said roll, and means for retarding said pulley.

29. In a pile-cutting machine, the combination of a drag-roll adapted to be rotated by the fabric, a pulley loose on said roll, a brake-shoe connected with said roll and engaging said pulley, and means for positively retarding said pulley.

30. In a pile-cutting machine, the combination of a drag-roll, a pulley loose on said roll, a brake-shoe engaging said pulley, a spring connecting said brake-shoe with said roll, and means for retarding said pulley.

31. In a pile-cutting machine, the combination of a drag-roll, a pulley loose on said roll, a brake-shoe connected with said roll and engaging said pulley, a spring acting on said brake-shoe, a spring connecting said brake-shoe with said roll, and means for retarding said pulley.

32. In a pile-cutting machine, the combination of a drag-roll, a pulley loose on said roll, a brake-shoe engaging said pulley, a spring adapted to act on said brake-shoe, and a cam carried by said roll for regulating the tension of said spring.

33. In a pile-cutting machine, the combination of a drag-roll, a pulley loose on said roll, a brake-shoe engaging said pulley, a spring adapted to act on said brake-shoe, a supplemental spring adapted to act on said brake-shoe, and a cam carried by said roll for regulating the tension of said supplemental spring.

34. In a pile-cutting machine, the combination of a drag-roll, a pulley loose on said roll, a brake-shoe engaging said pulley, a convolute spring connecting said brake-shoe with said roll, a spring adapted to act on said brake-shoe, and a cam carried by said roll for regulating the tension of said spring.

35. In a pile-cutting machine, the combination of a positively driven feed-roll, a drag-roll adapted to be rotated by the fabric, and means for taking up slack in the fabric between said rolls when the machine stops.

36. In a pile-cutting machine, the combination of a positively driven feed-roll, a drag-roll adapted to be rotated by the fabric, and means controlled by said drag-roll for taking up slack in the fabric between said rolls.

37. In a pile-cutting machine, the combination of a positively driven feed-roll, a drag-roll adapted to be rotated by the fabric, and connections between said drag-roll and said feed-roll for taking up slack in the fabric between said rolls.

38. In a pile-cutting machine, the combination of a positively driven feed-roll, a drag-roll adapted to be rotated by the fabric, a pulley loose on said drag-roll, and having connections to said feed-roll, and connections between said drag-roll and said pulley for operating said pulley to take up slack in the fabric.

39. In a pile-cutting machine, the combination with the feed-roll, of a spring-motor connected to said feed-roll for taking up slack in the fabric when the machine is stopped.

40. In a pile-cutting machine, the combination of a feed-roll, a drag-roll, means for holding said drag-roll, and a spring-motor connected to said feed-roll for taking up slack in the fabric between said rolls when the machine is stopped.

41. In a pile-cutting machine, the combination of a feed-roll, a drag-roll, means for holding said drag-roll, and a spring-motor connected to said feed-roll and adapted to operate automatically to take up slack in the fabric when the machine is stopped.

42. In a pile-cutting machine, the combination of a feed-roll, a drag-roll, a brake adapted to be applied to said drag-roll, a pulley loose on said drag-roll and having connections to said feed-roll, and a convolute spring, one end of which is connected to said drag-roll and the other end of which is operatively connected to said pulley.

43. In a pile-cutting machine, the combination of a positively driven feed-roll, a drag-roll adapted to be rotated by the fabric, a brake adapted to be applied to said drag-roll, means for disconnecting the power from said feed-roll and applying the brake to said drag-roll, and a spring-motor for rotating said feed-roll to take up slack in the fabric.

44. In a pile-cutting machine, the combination of a roll adapted to be rotated by the fabric in the forward feed thereof, and means for positively rotating said roll in the reverse direction.

45. In a pile-cutting machine, the combination of a positively driven feed-roll, a second roll adapted to be rotated by the fabric in the forward feed thereof, means for disconnecting the power from said feed-roll, and means for applying power to said second roll to feed the fabric in the reverse direction.

46. In a pile-cutting machine, the combination of a feed-roll, a second roll adapted to be rotated by the fabric in the forward feed thereof, a driving-shaft, means for connecting and disconnecting said feed-roll with said shaft, and means for connecting and disconnecting said second roll with said shaft.

47. In a pile-cutting machine, the combination of a roll adapted to be rotated by the fabric in the forward feed thereof, a pulley loose on said roll, and a friction-clutch for connecting said pulley to said roll to rotate the same in the reverse direction.

48. In a pile-cutting machine, the combination of a roll adapted to be rotated by the fabric in the forward feed thereof, a pulley loose on said roll, a friction-clutch for connecting said pulley to said roll to rotate the same in the reverse direction, said friction-clutch being automatically thrown in when the forward rotation of said roll is arrested.

49. In a pile-cutting machine, the combination of a feed-roll, a second roll adapted to be rotated by the fabric in the forward feed thereof, a pulley loose on said second roll, a friction-clutch for connecting said pulley to said roll to rotate the same in the reverse direction, a driving-shaft, means for connecting and disconnecting said feed-roll with said shaft, and means for connecting and disconnecting said pulley and second roll with said shaft.

50. In a pile-cutting machine, the combination of a positively driven feed-roll, a drag-roll adapted to be rotated by the fabric, between which rolls the fabric is to be cut, and a second positively driven feed-roll located at the rear of said drag-roll.

51. In a pile-cutting machine, the combination of a positively driven feed-roll, a drag-roll adapted to be rotated by the fabric, between which rolls the fabric is to be cut, and a second positively driven feed-roll located at the rear of and in proximity to said drag-roll.

52. In a pile-cutting machine, the combination of a positively driven feed-roll, a drag-roll adapted to be rotated by the fabric, between which rolls the fabric is to be cut, and two positively driven feed-rolls at the rear of said drag-roll, one of said rolls being located at the upper rear end of the machine.

53. In a pile-cutting machine, the combination of a feed-roll, a drag-roll, a movable tension-roll coöperating with said feed-roll, and a movable tension-roll coöperating with said drag-roll.

54. In a pile-cutting machine, the combination of a feed-roll, a drag-roll, a tension-roll coöperating with said feed-roll, a tension-roll coöperating with said drag-roll, and means for equalizing the pressure exerted by said tension-rolls.

55. In a pile-cutting machine, the combination of a feed-roll, a drag-roll, a tension-roll coöperating with said feed-roll, and a tension-roll coöperating with said drag-roll, each of said tension-rolls being mounted in pivoted levers.

56. In a pile-cutting machine, the combination of a feed-roll, a drag-roll, and a tension-roll coöperating with each of said rolls, each of said tension-rolls being mounted in pivoted levers, and the opposite ends of said levers being connected together.

57. In a pile-cutting machine, the combination of a feed-roll, a drag-roll, a tension-roll coöperating with each of said rolls, pivoted levers arranged at the opposite ends of said tension-rolls in which said tension-rolls are mounted, and connections embodying tension-springs between said levers.

58. In a pile-cutting machine, the combination of a feed-roll, a drag-roll, tension-rolls coöperating with each of said rolls, pivoted levers arranged at opposite ends of said rolls in which said tension-rolls are mounted, tension-springs connected with said levers, equalizing bars connected to said springs, and a connection between said equalizing bars.

59. In a pile cutting machine, a stop motion mechanism adapted to be operated by a bunch or seam in the fabric and comprising two members moving constantly in opposite directions, and means controlled by said bunch or seam and adapted to be operated by one or the other of said moving members for stopping the machine.

60. In a pile cutting machine, a stop motion mechanism adapted to be operated by a bunch or seam in the fabric and comprising two members moving constantly in opposite directions, and two tappets normally out of the path of said moving members, one of said tappets being adapted to be brought into the path of one of said moving members, and the other tappet being adapted to be brought into the path of the other moving member under the action of said bunch or seam.

61. In a pile cutting machine, a stop motion mechanism adapted to be operated by a bunch or seam in the fabric and comprising two members moving constantly in opposite directions, two tappets normally out of the path of said moving members, and means controlled by said bunch or seam for causing said tappets to be brought one into the path of one of said moving members and the other into the path of the other moving member.

62. In a pile cutting machine, the combination of a driving shaft, a feed-roll, a clutch for connecting and disconnecting said feed-roll and said shaft, a single latch for said clutch, a movable bar adapted to unlatch said latch, and means controlled by a bunch or seam in the fabric and adapted to operate said movable bar.

63. In a pile cutting machine, the combination of a driving shaft, a feed roll, a clutch for connecting and disconnecting said feed roll and said shaft, a latch for said clutch, a brake, a latch for said brake, said latches being separately operable, a movable bar adapted to unlatch both of said latches, and means controlled by a bunch or seam in the fabric and adapted to operate said movable bar.

64. In a pile cutting machine, the combination of a driving shaft, a feed roll, a clutch for connecting and disconnecting said feed roll and said shaft, a latch for said clutch, a brake, a movable bar constituting a latch for said brake, said movable bar being also adapted to unlatch the latch for said clutch, and means controlled by a bunch or seam in the fabric and adapted to operate said movable bar.

65. In a pile cutting machine, a stop motion mechanism comprising two members constantly moving in opposite directions, two tappets normally out of the path of said moving members, means comprising an electric circuit for causing said tappets to be brought one into the path of one of said moving members and the other into the path of the other moving member, and means controlled by a bunch or seam in the fabric and adapted to operate said electric circuit.

66. In a pile cutting machine, a stop motion mechanism comprising two members constantly moving in opposite directions, two tappets normally out of the path of said moving members but adapted to be brought one into the path of one moving member and the other into the path of the other moving member, an electric circuit for controlling the operation of said tappets, a circuit closer normally open, and means controlled by a bunch or seam in the fabric and adapted to operate said circuit closer to close said electric circuit.

67. In a pile-cutting machine, a stop-motion mechanism comprising a constantly moving member, devices adapted to be brought into engagement therewith and operated thereby for stopping the machine, and means for automatically resetting said devices in their normal positions after they have operated.

68. In a pile-cutting machine, a stop-motion mechanism comprising a constantly moving member, devices adapted to be brought into engagement therewith and operated thereby for stopping the machine, an electric-circuit for controlling the operation of said devices, and means for automatically resetting said devices when they have operated.

69. In a pile-cutting machine, a support for the cutting-knife comprising a bar, a sleeve slidably mounted on said bar, but incapable of rotation thereon, a second sleeve rotatably mounted on said first sleeve, and means for limiting the rotary movement of said second sleeve.

70. In a pile-cutting machine, a support for the cutting-knife comprising a bar, a sleeve slidably mounted on said bar, but incapable of rotation thereon, a second sleeve rotatably mounted on said first sleeve, and means for limiting the rotary movement of said second sleeve, said second sleeve being provided with means to engage the knife-holder and to resist the backward thrust of the knife in the operation of cutting the fabric.

ARTHUR MORTON.

Witnesses:
W. H. THURSTON,
J. H. THURSTON.

Copies of this patent may be obtained for five cents each, by addressing the "Commissioner of Patents, Washington, D. C."